Nov. 7, 1961  A. R. BIEDESS  3,007,352
PLANETARY DRIVE MECHANISMS FOR EXCAVATING
MACHINES OR THE LIKE
Filed April 9, 1958
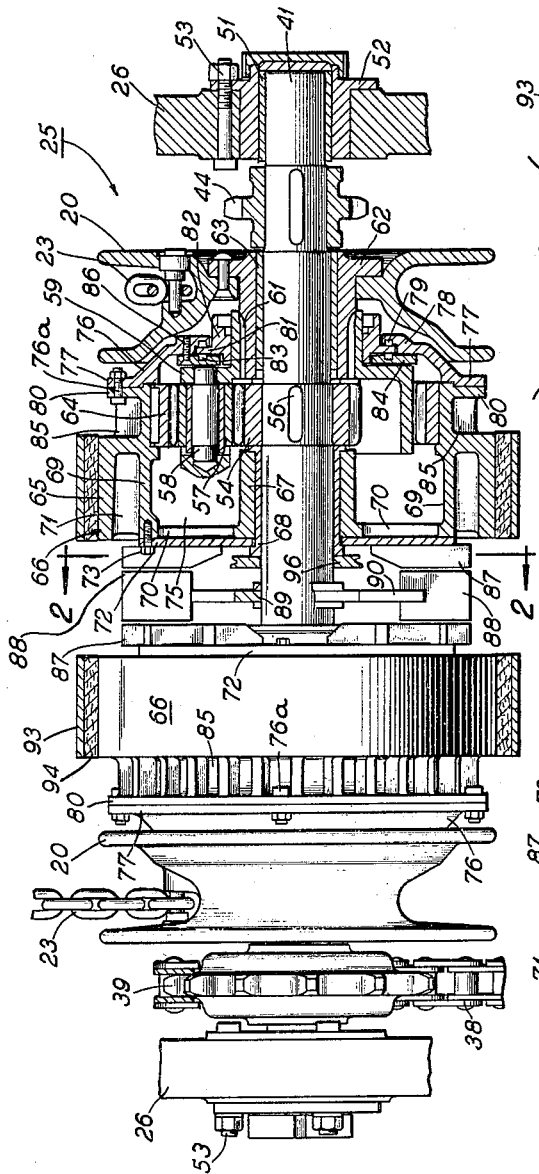
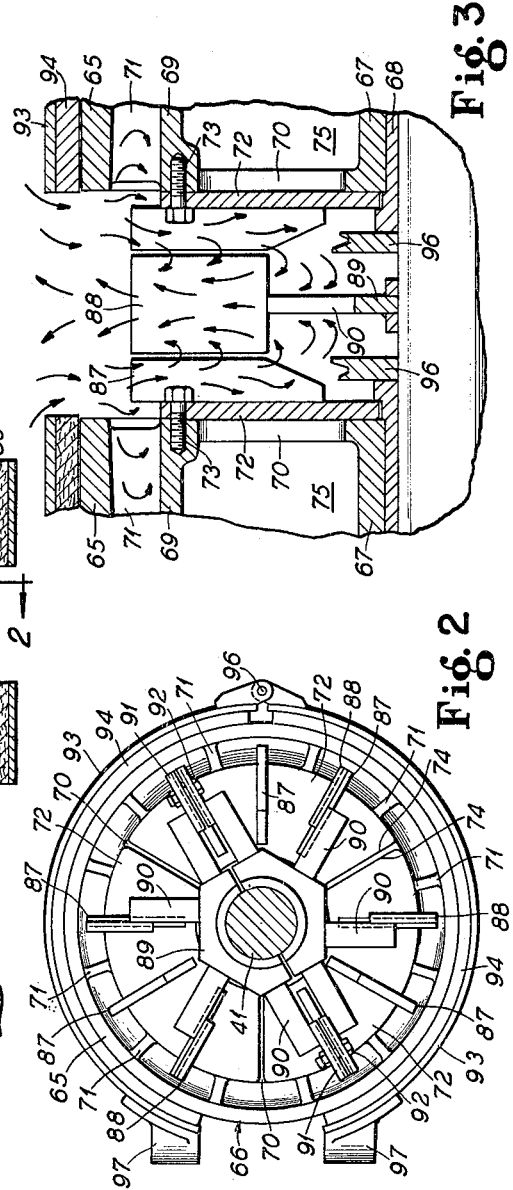
INVENTOR.
Anthony R. Biedess
BY
Murray A. Gleeson
ATTORNEY

United States Patent Office 3,007,352
Patented Nov. 7, 1961

3,007,352
PLANETARY DRIVE MECHANISMS FOR EXCAVATING MACHINES OR THE LIKE
Anthony R. Biedess, Chicago, Ill., assignor to Goodman Manufacturing Company, Chicago, Ill., a corporation of Illinois
Filed Apr. 9, 1958, Ser. No. 727,381
3 Claims. (Cl. 74—785)

This invention relates generally to improvements in planetary transmissions and particularly to a self-cooled planetary transmission for an excavating machine or the like.

In Biedess Patent No. 2,619,243 for Improvements in Mucking Machine there is shown a planetary transmission for effecting both hoisting and swinging movements of an excavating bucket. The transmission shown in said patent makes use of a pair of band brakes for controlling both hoisting and swinging. Under conditions when the machine is operating in a very warm ambient such as in a mine tunnel or the like, the band brakes and the lubricating oil for the transmission may become inordinately hot after prolonged operation. This is particularly true when the machine is operating at high altitudes where the dissipation of heat into the ambient is greatly reduced because the ambient air does not conduct the heat away since it has a lower specific heat.

The excessive heating of the transmission can be greatly minimized by causing air to be swept in large amounts past the brake drums. According to the present invention, the brake drum is constructed with a braking surface separated by another annular surface so as to provide an annular shaped cavity into which the coolant air can circulate, thereby cooling both the outer braking surface and the inner surface, the inner surface being in contact with lubricant for a planetary transmission of which the brake drums are a part. The cavity carrying the lubricant for the planetary train is closed by a plate turning with the brake drum and carrying thereon impeller blades which turn with the drum. These impeller blades move relative to impeller blades mounted fast upon the main drive shaft carrying the sun gear for the planetary transmission.

In a preferred embodiment of the invention the drive shaft supports spinner rings which operate to throw off by centrifugal force any lubricant escaping from the cavity described, and away from proximity to the braking material cooperating with the brake drums.

With the foregoing considerations in mind it is a principal object of this invention to provide an improved planetary drive transmission characterized by the ability to operate in ambients tending to produce overheating.

Another object is to provide an improved planetary transmission characterized by a brake drum having a configuration so as to induce the circulation of coolant air therearound.

Yet another object is to provide a planetary transmission characterized by a brake drum having the aforesaid configuration and cooperating with impeller blades turning therewith and further impeller blades turning with a main driving shaft, there being provided a large differential speed between the drum and the shaft to give good circulation of cooling air around the drum.

Other objects and important features of the invention will be apparent from a study of the specification following taken with the drawings which together describe and illustrate a preferred embodiment of the invention and what is now considered to be the best mode of practicing the principles thereof. Other embodiments may be suggested to those having the benefits of the teachings therein and such other embodiments are intended to be reserved especially as they fall within the scope and spirit of the subjoined claims.

In the drawings:

FIG. 1 is a part plan and a part longitudinal sectional view taken through the improved planetary transmission according to the present invention, certain parts of the sectional view being shown in plan also;

FIG. 2 is a transverse elevation view taken substantially along the line 2—2 of FIG. 1 looking in the direction of the arrows; and FIG. 3 is a partly longitudinal sectional view taken to an enlarged scale, certain parts being shown in elevation and showing the path taken by the cooling air past the transmission.

Referring now to FIG. 1 of the drawings, the drive shaft 41 is supported at each end thereof in the side frame 26, each end of shaft 41 turning in a bushing 51 held in a bearing support 52 held by bolts 53 to the frame 26.

The planetary transmission 25 includes a pair of sun gears 54 spaced along the shaft 41 and keyed thereto as at 56. The shaft 41 is driven from a suitable power source by means of the chain 38 engaging the sprocket 39. Each sun gear 54 meshes with planet gears 57 supported upon stub shafts 58 extending from a spider 59 keyed at 61 to a hub 62 turning freely with respect to the shaft 41 upon a bushing 63. The hub 62 has riveted thereto the winch 20.

Planet gears 57 also mesh with an internal ring gear 64 formed on a brake drum indicated generally by the reference numeral 66. The brake drum 66 includes a hub 67 supported on a bushing 68 in turn supported upon the shaft 41, radially extending members or spokes 70 extending from the hub 67 and being cast integrally with an inner annular flange 69. Radially extending webs 71 from the inner annular flange 69 connect the same to an outer braking flange 65.

A cavity 75 defined by the hub 67 and the inner annular flange 69, see also FIG. 3, is closed by plates 72 held to the inner annular flange 69 by cap screws 73. As seen in FIG. 2, the plates 72 consist of three portions each embracing 120° of central angle, the edges 74 of each portion abutting the spokes 70, there also being cap screws, not shown, for holding the three segments to the hub 67.

The cavity 75 is also closed by a closure 76 bolted at 76a at its periphery 77 to a flange 80 extending from the brake drum 66. The closure 76 has an inner flange 78 supporting a sealing ring 79 bearing against a flange 81 of a thrust absorbing member 82, there being a sealing ring 83 supported in a ring 84 held by screws 86 to the flange 78. Ring 84 bears against the planet spider 59. The aforesaid construction comprising the ring 84, the thrust absorbing member 82 and the inner flange 78 limits endwise movement of the spider 59.

The cavity 75 defined by the closure plates 72 and the just described construction is filled with lubricant for the spider pinions 57, the internal ring gear 64, the sun gear 54, and the planet gear stub shafts 58.

Fins 85 are provided exterior of the internal ring 64 for cooling.

The closure plates 72 are each provided with impeller blades 87, see also FIG. 2, which rotate with the brake drums 66. These impeller blades cooperate with impeller blades 88 turning with the main drive shaft 41. Impeller blades 88 extend radially from a split hexagonal nut 89, the nut 89 having arms 90 and lateral extensions 91 therefrom which are clamped together with bolts 92. These lateral extensions 91 also serve as impeller blades 88.

As has been previously described, the brake drum 66 is arranged to be held in position to provide an abutment for the planet gears 57 so they can have planetary motion with respect to the sun gear 54 to drive the spider 59 supporting the planet gears 57 at reduced speed, and thereby turn the winch 20 in a direction to raise the bucket 19.

Means are provided to brake the drum 66, and as seen in FIG. 2, such brake consists of a pair of internal contracting brake shoes 93 having friction linings 94 thereon, see also FIG. 3, the brake shoes being pivotally connected as at 96 and having suitable means located as at 97 for contracting the brake shoes 93 against the drum 66.

Such operation of the brake linings 94 against the brake drums 66 creates a large amount of heat sufficient, were it not for the invention herein, to damage the linings 94 and to heat inordinately the lubricant within the cavity 75.

When drum 66 is braked, impellers 88 will move with shaft 41 with respect to the braked drum 66. The cooperation of impellers 88 with the impellers 87 causes air to sweep between the outer flange 65 of brake drum 66 and inner flange 69, the air entering within the cavity formed between such flanges and the radially extending webs member 71 connecting such flanges. Likewise, any differential speed of impellers 87 and 88 when the drum 66 is only partly braked and still rotating causes the coolant air to be swept into and out of the aforesaid cavities. Movement of the air as seen in FIG. 3, also occurs past the closure plates 72 and also cools the lubricant within cavity 75.

However, the operation of a mucking machine of the type referred to herein is such that the speed differential between the drum 66 and the drive shaft 41 is greatest when the drum 66 is released, at which time the pinion supporting spider 59 is immobile and the drum 66 is "free-wheeling" in a direction opposite to the direction of shaft 41. This occurs as a general proposition, during that portion of the cycle when the bucket is being crowded into a bank of spoil. By way of example, the differential speed between the drive shaft 41 and the brake drum 66 may be of the order of 200 r.p.m., at which time the cooling effect of the cooperating impellers 87 and 88 is the greatest. This affords an opportunity for the larger differential speed between the impellers 87 and the impellers 88 turning with the main drive shaft 41 to provide a large cooling effect.

The aforesaid impellers 87 and 88 also afford a means of centrifugally dispersing any lubricant which has escaped along the shaft 41 and around the bushing 68. An oil slinger ring 96 is accordingly mounted in abutting relationship with the bushing 68, and the oil slung from ring 96 will travel along the impellers 88 and 87 to be discharged centrifugally and away from the brake lining 94.

Apparatus according to the present invention has proved to be particularly effective when working at high altitudes where the ability of the air to conduct heat is greatly lessed. It has been found that the provision of the spaced annular surfaces in the brake drum 66 and the provision of the impellers on the brake drums and the driving shaft, particularly when counter-rotating, is effective to provide ample cooling of the entire mechanism. Moreover, the impellers 87 and 88 cooperate with the slinger rings 96 to prevent oil or lubricant from coming into contact with the braking material 94.

While the invention has been described in terms of a preferred embodiment, its scope is intended to be limited only by the claims here appended.

I claim as my invention:

1. In a multiple brake drum and band controlled planetary transmission for a plurality of axially spaced winches including opposed gear housings within said drums, one for each drum, providing supporting hub and spider means for said drums, and a drive shaft for said transmissions on which said hubs are journaled in axially spaced relationship, a sun gear on the shaft within each housing, a hub adjacent each sun gear, rotatably mounted on the shaft, a spider on the hub and planet gears on each spider meshing with the sun gear, and a ring gear in each housing in mesh with the planet gears, the improvement comprising radial heat dissipating fins on the opposed sides of said housings and being drivingly connected to the planetary system through the ring gear, and an impeller fan rigidly mounted on said shaft intermediate the opposed sides of said housings and in closely spaced relation to the radial fins thereon whereby variably different speeds of rotation between the fins of the respective transmission housings as well as the intermediate fan impeller insures constant coolant air circulation to each of said drums during operation of said shaft, a brake band on each housing for controlling the rotation of the associated winch.

2. The structure as defined by claim 1 in which said impeller fan comprises a plurality of rectangular vanes outwardly spaced from said shaft, and each of said heat dissipating fans on the opposed sides of said housings having one side thereof closely paralleling a side of said impeller fan and extending inwardly therebeyond toward said housings and shaft.

3. The structure as defined in claim 2 including a flange spaced inwardly of each drum, radial vanes in the space between the drum and the flange for circulating cooling fluid for cooling the brake drums.

References Cited in the file of this patent

UNITED STATES PATENTS

| | | |
|---|---|---|
| 1,380,134 | Cook | May 31, 1921 |
| 1,386,979 | Wickersham | Aug. 9, 1921 |
| 1,422,375 | Reid | July 11, 1922 |
| 1,924,060 | Huck | Aug. 22, 1933 |
| 2,068,062 | Metten | Jan. 19, 1937 |
| 2,343,465 | Magee | Mar. 7, 1944 |
| 2,583,751 | Schmitter | Jan. 29, 1952 |

UNITED STATES PATENT OFFICE
CERTIFICATION OF CORRECTION

Patent No. 3,007,352                                        November 7, 1961

Anthony R. Biedess

It is hereby certified that error appears in the above numbered patent requiring correction and that the said Letters Patent should read as corrected below.

Column 1, line 32, for "by" read -- from --; column 3, line 36, for "spoil" read -- soil --; line 55, for "lessed" read -- lessened --.

Signed and sealed this 10th day of April 1962.

(SEAL)
Attest:

ERNEST W. SWIDER                                           DAVID L. LADD
Attesting Officer                                            Commissioner of Patents